US006809265B1

(12) United States Patent
Gladd et al.

(10) Patent No.: US 6,809,265 B1
(45) Date of Patent: Oct. 26, 2004

(54) TERMINAL ASSEMBLY FOR A COAXIAL CABLE

(75) Inventors: Joseph Howard Gladd, Cortland, OH (US); Jeffrey Michael Hickox, Middlefield, OH (US); William C Ketterer, Girard, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/414,165

(22) Filed: Apr. 15, 2003

(51) Int. Cl.[7] .......... H02G 15/02

(52) U.S. Cl. .......... 174/74 R; 174/78; 174/84 C; 439/607; 439/608

(58) Field of Search .......... 174/74 R, 75 C, 174/77 R, 78, 84 R, 88 C; 439/578, 108, 98, 99, 668, 609, 579, 669, 696, 737, 95, 394, 686, 687

(56) References Cited

U.S. PATENT DOCUMENTS 3,854,003 A * 12/1974 Duret .......... 174/88 C
4,493,946 A * 1/1985 Duret .......... 174/88 C
4,857,014 A * 8/1989 Alf et al. .......... 439/578
4,892,491 A * 1/1990 Budano et al. .......... 439/582
4,995,836 A * 2/1991 Toramoto .......... 439/675
5,205,761 A * 4/1993 Nilsson .......... 439/578
5,261,019 A * 11/1993 Beard et al. .......... 385/60
5,475,782 A * 12/1995 Ziebol .......... 385/87
5,547,395 A * 8/1996 Delamotte .......... 439/578
5,691,251 A * 11/1997 Skopic .......... 439/578
5,695,357 A * 12/1997 Wright .......... 439/394
5,730,622 A * 3/1998 Olson .......... 439/578
5,917,975 A * 6/1999 Bloom .......... 385/78
5,965,847 A * 10/1999 Tanaka et al. .......... 174/84 R
5,993,230 A * 11/1999 Gauker et al. .......... 439/188
5,993,253 A * 11/1999 Sai .......... 439/578
6,191,746 B1 2/2001 Nagy
6,211,831 B1 4/2001 Nagy et al.
6,297,447 B1 * 10/2001 Burnett et al. .......... 174/40 CC
6,575,786 B1 * 6/2003 Khemakhem et al. .......... 439/580
6,609,931 B2 * 8/2003 Parrish et al. .......... 439/578
6,648,674 B1 * 11/2003 Dobler .......... 439/460

* cited by examiner

*Primary Examiner*—William H. Mayo, III
(74) *Attorney, Agent, or Firm*—David P. Wood

(57) ABSTRACT

A terminal for a coaxial cable includes an electrically conductive core mounted in a dielectric member. The dielectric member along with the conductive core are positioned within an electrically conductive ground shield. The ground shield includes two identical split-barrel housing members which are joined together. When joined, the housing members form a cylindrical channel having surfaces which intimately contact an exposed length of cable outer conductor layer, creating a conductive connection between the outer conductor layer and the ground shield and structurally maintaining the outer conductor layer concentric to the dielectric sheath and inner conductor of the cable.

19 Claims, 3 Drawing Sheets

20b
100
16
200
206
202
208
210
204
92
108
110
106
20a
104

16
20a
114
76
88
112
110
78
108
106
104
116
80
70
98
82
84
20b
94
72
86
100
30
12
32
34
38
36
10
60
66
58
64
14
52
62
18
A
200
208
206
92
204
202

TERMINAL ASSEMBLY FOR A COAXIAL CABLE

TECHNICAL FIELD

The present invention relates to electrical terminals for connection to coaxial cable and more particularly relates to a terminal having a two-piece ground shield.

BACKGROUND OF THE INVENTION

A typical coaxial cable for signal transmission includes a center conductive core or inner conductor surrounded by an inner dielectric sheath. An outer conductor or conductive shield surrounds the inner dielectric sheath and typically is a metal braid. The conductive shield is surrounded by an outer dielectric sheath of the cable.

Electrical terminals are known for terminating a coaxial cable so that the cable can be connected to another connecting device, such as a complementary mating connector, a printed circuit board, and the like. Such terminals typically include a core conductor or contact for mechanically and electrically connecting to an end of the inner conductor of the cable, a dielectric sleeve therearound, and an outer conductor or ground shield for mechanically and electrically connecting to the outer conductor of the cable.

The terminal must be configured and connected to the coaxial cable in such a manner as to minimize voltage standing wave ratio (VSWR), insertion losses, and radio frequency (RF) leakage. Commonly, the largest component of insertion loss is reflection due to impedance discontinuities. Energy reflected at impedance discontinuities does not reach the load. Such discontinuities result from variations in the radial distance between the outer surface of the inner conductor and the inner surface of the outer conductor. Such discontinuities include changes in diameter in either conductor or deformation of either conductor. RF leakage results from radiation loss through holes or seams in the terminal or cable.

Electrical and mechanical connection of the core conductor of the terminal to the inner conductor of the cable is commonly established by axially inserting the inner conductor into the core conductor and then radially crimping and/or to soldering the core conductor of the terminal to the inner conductor of the cable. It is also common for such electrical and mechanical connection of the ground shield to the outer conductor of the cable to be established by a method that includes stripping the end of the coaxial cable, sliding a ferrule onto the cable, folding the outer conductor braiding back over the outer dielectric sheath, inserting the stripped end of the coaxial cable into the ground shield, unfolding the braiding over the ground shield, sliding the ferrule over the braiding and ground shield, then crimping the ferrule to the braiding thereby pressing the braiding against the ground shield.

U.S. Pat. No. 3,854,003 to Duret discloses a ground shield terminal assembly comprising two elastic half-shell conductive housing members having chamfered ends. The assembled housing members are surrounded by a threaded metallic sleeve which enables a nut to cooperate with the threads to press a ring having an inclined surface over the chamfered ends to deform the housing members, thereby pressing them against the outer conductor of a coaxial cable.

Such known methods for assembling a terminal to a coaxial cable are labor intensive and technique sensitive. These methods require significant manual manipulation of the shielding braid which deforms the outer conductor causing reflection and insertion loss. Crimping also deforms the outer conductor causing reflection and insertion loss. Variation in assembly technique impacts the integrity of the connection and results in variation in performance.

Known coaxial cable connectors commonly include a threaded, cylindrical ground shield which has an axially extending bore. These known ground shields commonly include plating on outside surfaces and on inside surfaces which define the bore. It is difficult to apply a uniform plating to inside surfaces of such a design. Plating voids thereby result which increase reflection and leakage losses.

As the use of high frequency systems such as digital satellite radio, Global Positioning Systems (GPS), cell phones, and mobile television continues to grow there is an increasing need for coaxial cable connectors which meet the radio frequency performance needs of such systems, offer consistent performance, and are easy and inexpensive to assemble.

SUMMARY OF THE INVENTION

The present invention provides advantages and alternatives over the prior art by providing a terminal for connection to a coaxial cable, together with a ground shield and a method for assembling the ground shield to a coaxial cable. The terminal comprises a two-piece ground shield capable of being connected to an outer conductor of the cable without the need to deform the outer conductor either by dressing it over the ground shield or by crimping it to the ground shield. Importantly, the terminal is capable of being used to carry high frequency signals such as those used by communication and entertainment systems in automotive and other applications.

According to a preferred embodiment of the present invention disclosed herein, a terminal assembly for a coaxial cable is provided which includes a ground shield with surfaces defining an internal passageway In the preferred embodiment, the ground shield includes a strain relief portion having protruding ribs for engaging an outer dielectric sheath of the coaxial cable and a contact portion for electrically and mechanically bonding an outer conductor of the coaxial cable to the ground shield. As a result, it is not necessary to crimp the outer conductor to the ground shield.

In the preferred embodiment, the ground shield is comprised of two identical shield halves joined at a plane extending along an axis of the internal passageway. Each of the shield halves is constructed using a die cast process enabling strain relief features, internal component retention features, and shapes that optimize radio frequency performance to be easily produced. The two-piece design enables the ground shield to have a uniform plating. Each of the shield halves is easier to reliably plate than a complete shield having a bore.

A method is provided for assembling the ground shield of the present invention to a coaxial cable. The method enables automated assembly of the ground shield to the cable.

These and other features and advantages of the present invention will become apparent from the following brief description of the drawings, detailed description, and appended drawings.

BRIEF DESCRIPTION OF THE DRAWINGS

The present invention will now be described, by way of example, with reference to the accompanying drawings, in which.

DETAILED DESCRIPTION OF THE INVENTION

Figures 1, 2:
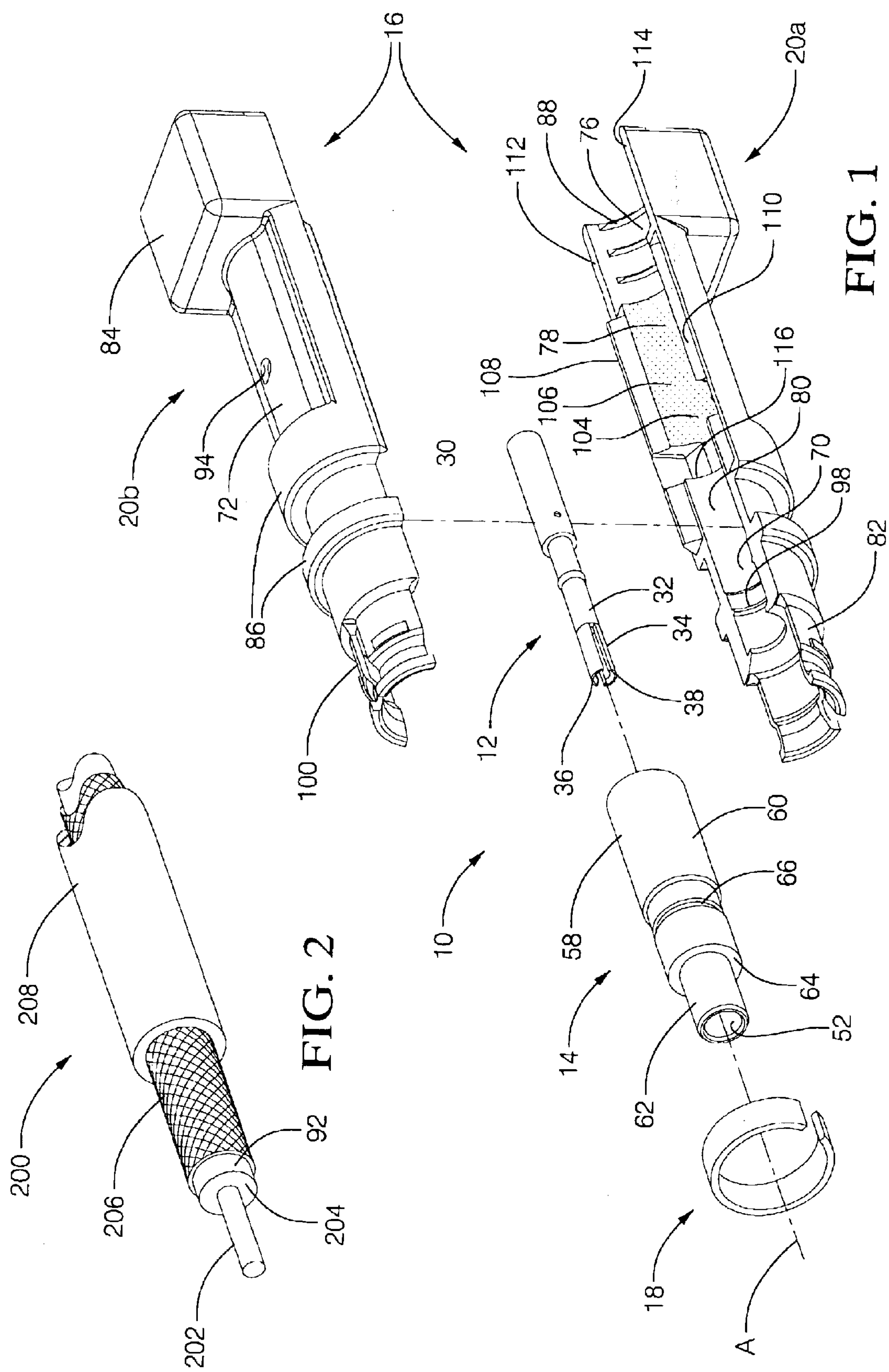
FIG. 1 is an exploded perspective view of a preferred embodiment of a terminal according to the present invention.
FIG. 2 is a side elevation view of a coaxial cable with various internal layers exposed.
Figure 3:
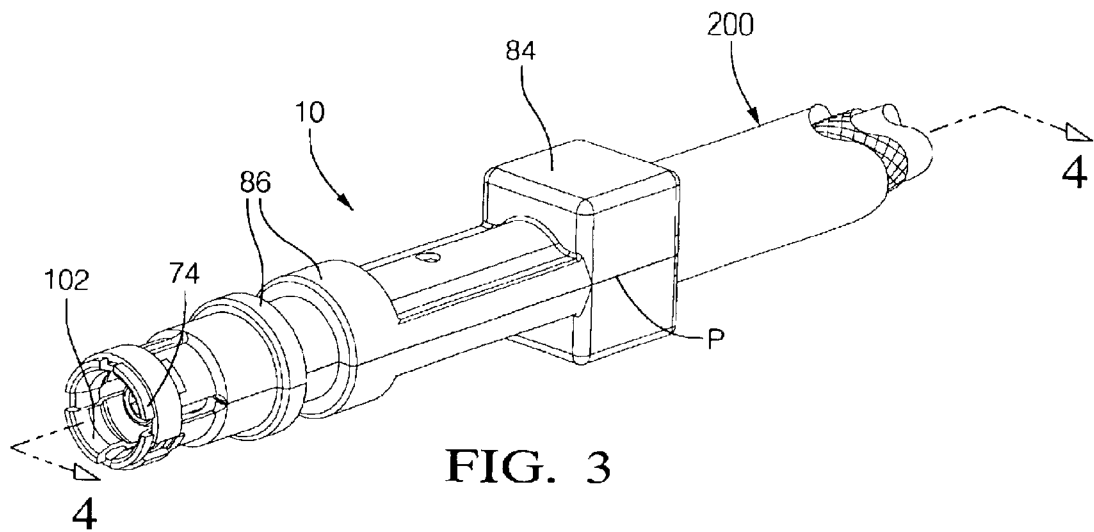
FIG. 3 is a perspective view of the terminal of FIG. 1.
Figure 4:
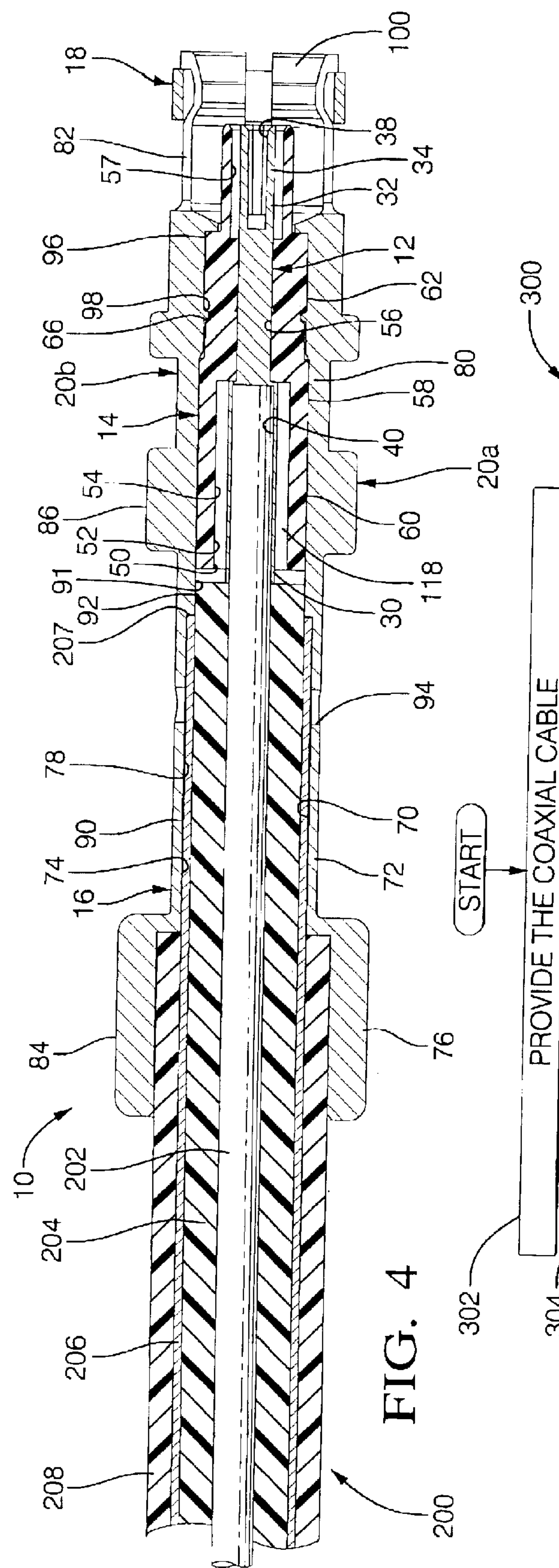
FIG. 4 is a view taken along line 4—4 of FIG. 3.

Referring to the figures wherein like numerals refer to like elements throughout the several views, FIGS. 1, 3, and 4 illustrate a preferred embodiment of an electrical terminal 10 of the present invention. The terminal 10 includes an electrically conductive core conductor 12, a dielectric member 14, a conductive ground shield 16, and a split ring support 18. The ground shield 16 is an assembly of two identical ground shield halves or housing members 20*a*, 20*b*. When joined, the ground shield housing members 20*a*, 20*b* define the completed ground shield 16. Each ground shield housing member 20*a*, 20*b* is preferably a rigid die cast member constructed of a nickel plated zinc alloy.

FIG. 2 illustrates a coaxial cable 200 which includes an inner conductor 202, an inner dielectric sheath 204 around the inner conductor 202, an outer conductor layer 206 having a cylindrical outer surface and concentrically surrounding the inner dielectric sheath 204 and the inner conductor 202, and an outer dielectric sheath 208 around the outer conductor layer 206. The coaxial cable 200 is shown stripped back with an exposed tip of the inner conductor 202, an exposed axial length of the inner dielectric sheath 204, and an exposed axial length of the outer conductor layer 206.

Referring back to FIGS. 1, 3, and 4, the core conductor 12 includes a body portion 30 and a contact portion 32. Preferably, the core conductor 12 is formed from sheet metal which is preferably gold plated brass which is stamped and then rolled to form the generally cylindrical shape of the core conductor 12. The contact portion 32 includes two spring members 34 which extend from the body portion 30 and terminate at distal ends 36. The spring members 34 have opposing surfaces which define a pin-receiving bore 38. The body portion 30 includes an inner surface which defines an inner conductor receiving bore 40.

The dielectric member 14 has a generally cylindrical shape and is preferably made of Teflon or a material comparable to the inner dielectric sheath 204. An inner surface 50 of the dielectric member 14 defines an axially extending bore 52. The inner surface 50 includes a first portion 54 for containing the body portion 30 of the core conductor 12. An annular gap 118 extends between the first portion 54 of the inner surface 50 of the dielectric member 14 and body portion 30 of the core conductor 12 to allow room for protrusions (not shown) in the body portion 30 caused by crimping. The inner surface 50 also includes a second portion 56 for retaining the contact portion 32 of the core conductor 12. The inner surface 50 further includes a third portion 57 which surrounds the spring members 34 of the core conductor 12. The inner surface 50 of the dielectric member 14 holds the core conductor 12 in axial alignment within the terminal 10. The dielectric member 14 further includes an outer surface 58. The outer surface 58 includes a large diameter portion 60, a reduced diameter portion 62, and a transition portion 64 therebetween. The outer surface 58 also includes an annular groove 66.

The ground shield 16 includes an inner surface 70 and an outer surface 72. The inner surface 70 defines an axially extending passageway 74. The ground shield 16 includes a rearward strain relief portion 76 for contact with the outer dielectric sheath 208 of the coaxial cable 200, a contact portion 78 for electrical connection with the outer conductor layer 206 of the coaxial cable 200, a support portion 80 which retains the dielectric member 14, and a forward mating portion 82 for connection with a complementary ground of a mating connector (not shown). Each of the two ground shield housing members 20*a*, 20*b* generally have a split barrel shape and are aligned along a plane P of separation running parallel to a longitudinal axis A of the ground shield 16. The ground shield 16 includes an enlarged rearward outer portion 84 which serves as a processing aid. Enlarged diameter portions 86 on a mid-portion of the outer surface 72 align with features on a complementary coaxial cable connector housing (not shown).

The inner surface 70 of the strain relief portion 76 includes a plurality of spaced strain relief ribs 88 each extending partially around a circumference of the inner surface 70 for gripping the outer dielectric sheath 208 of the coaxial cable 200.

The contact portion 78 of the inner surface 70 of the ground shield 16 is shaped to intimately match the shape of the outer surface of the exposed length of the outer conductor layer 206. When the ground shield housing members 20*a*, 20*b* are joined together over the exposed length of the outer conductor layer 206, a conductive connection is created between the ground shield 16 and the outer conductor layer 206. The inner surface 70 of the ground shield 16 structurally maintains the outer conductor layer 206 concentric to the dielectric sheath 204 and the inner conductor 202 without the need to deform the outer conductor layer 206 either by dressing it over the ground shield 16, by crimping it to the ground shield 16, or by tightening the ground shield 16 around the outer conductor layer 206.

In the preferred embodiment, a conductive bonding agent 90 is disposed on the contact portion 78 of the inner surface 70 of the ground shield 16 and the outer conductor layer 206 of (he coaxial cable 200. Solder is the preferred bonding agent. However, conductive epoxy or other bonding agents may also be used. The conductive bonding agent 90 bonds the outer conductor layer 206 to the ground shield 16 and fills in voids and discontinuities between the outer conductor layer 206 and the ground shield 16. The conductive bonding agent 90 also bonds the first ground shield housing member 20*a* to the second ground shield housing member 20*b*. At a distal end 207 of the exposed axial length of outer conductor 206, the inner surface 70 of the ground shield transitions to a first reduced diameter portion 91. The exposed axial length (shown at 92) of inner dielectric 204 presses against the first reduced diameter portion 91 of the ground shield 16 preventing the conductive bonding agent 90 from contacting the exposed axial length of inner conductor 202 or the core conductor 12. An aperture 94 extends through the contact portion 78 of each ground shield housing member 20*a*, 20*b* enabling visual inspection of the conductive bonding agent 90.

In some alternate embodiments, no conductive bonding agent 90 is used and the ground shield housing members 20*a*, 20*b* are joined together by welding, by form fit, or by another attachment mechanism known to those skilled in the art. Once so attached, the inner surface 70 of the ground shield 16 intimately contacts the exposed layer of outer conductor layer 206 providing an electrical connection between the ground shield 16 and the outer conductor layer 206.

The dielectric support portion 80 includes a second reduced inner diameter portion 96 which surrounds the reduced diameter portion 62 of the dielectric member 14. The dielectric support portion 80 also includes an annular rib 98 on the inner surface 70 for engaging the annular groove 66 in the dielectric member 14.

The forward mating portion 82 includes four spaced contact beams 100 which extend forwardly from the dielectric support portion 80. Inside surfaces of the four contact beams 100 form an opening 102 for receiving a complementary mating ground shield (not shown). The split ring support 18 extends around the outside surface of the contact beams 100 to provide a normal force when a complementary ground (not shown) is mated to the ground shield 16.

Prior to assembly, each ground shield housing member **20*a*, 20*b* defines an axially extending open-ended trough or channel 104. The channel 104 has an open side such that a cross-section of the channel 104 forms substantially onehalf of a cylindrical surface of the passageway 74. In the preferred embodiment, each ground shield housing member 20*a*, 20*b* includes a coating 106 of the conductive bonding agent 90 disposed on the channel 104 surface in an area that forms the contact portion 78 of the completed ground shell 16. The coating 106 is preferably a solder paste. Alternately, other conductive coatings or claddings can be used. Each ground shield housing member 20*a*, 20*b* can also be provided without a coating 106** or cladding.

Each of the ground shield housing members **20*a*, 20*b* include mateable, integral attachment members which include a protruding rail 108 and a complementary slot 10 which extend longitudinally along opposing edges 112, 114 of each ground shield housing member 20*a*, 20*b*. When the housing members 20*a*, 20*b* are assembled into the completed ground shield 16, the rail 108 and the slot 110 are positioned such that the rail 108 on each ground shield housing member 20*a*, 20*b* is received in the slot 110 of the other ground shield housing member 20*b*, 20*a*. In the preferred embodiment, a notched portion 116 of channel 104 provides room for a braiding of the outer conductor layer 206 to fan out. This helps to prevent a loose braiding strand from lodging between the two ground shield housing members 20*a*, 20*b***

FIGS. 1, 3, and 4 illustrate a female configuration of the terminal 10 of the present invention. Male configurations of the terminal of the present invention may also be produced in a manner well known to those skilled in the art.

Figure 6:
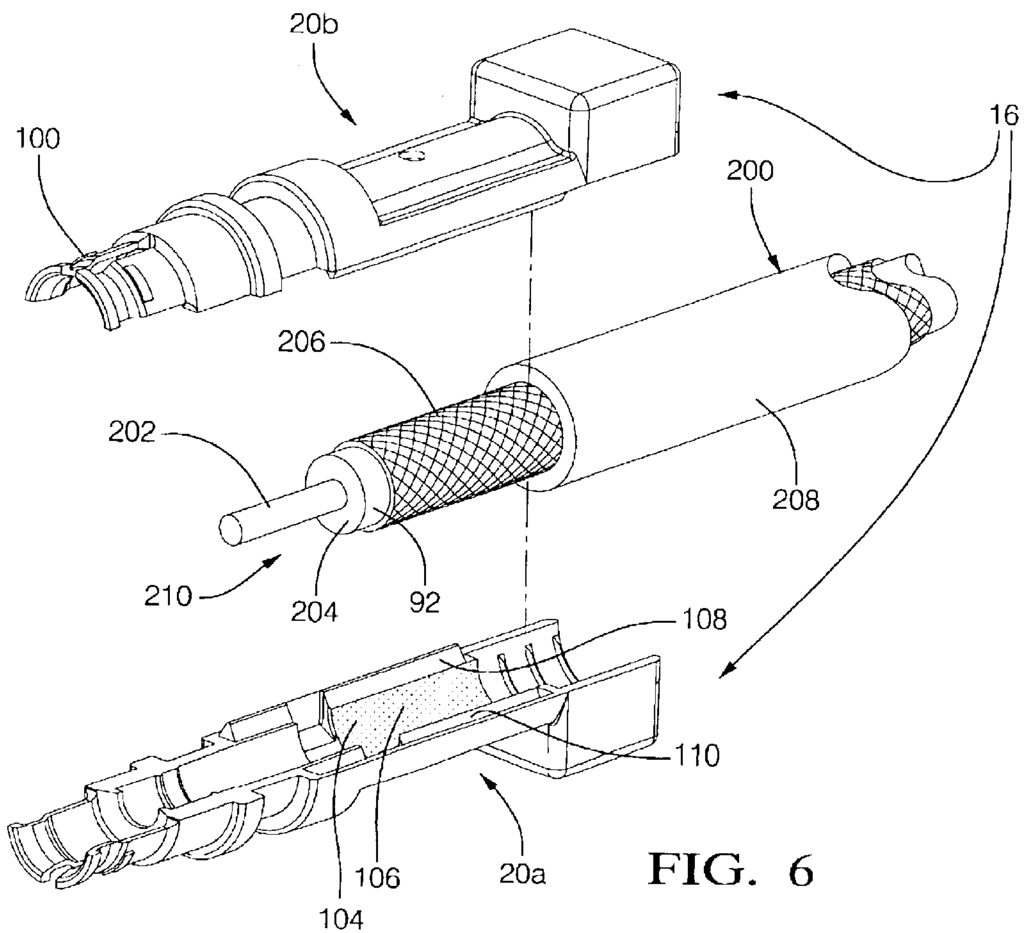
FIG. 6 is an exploded perspective view an aspect of the terminal of FIG. 1, but with a cable in place to illustrate the elements identified in FIG. 5.
Figure 5:
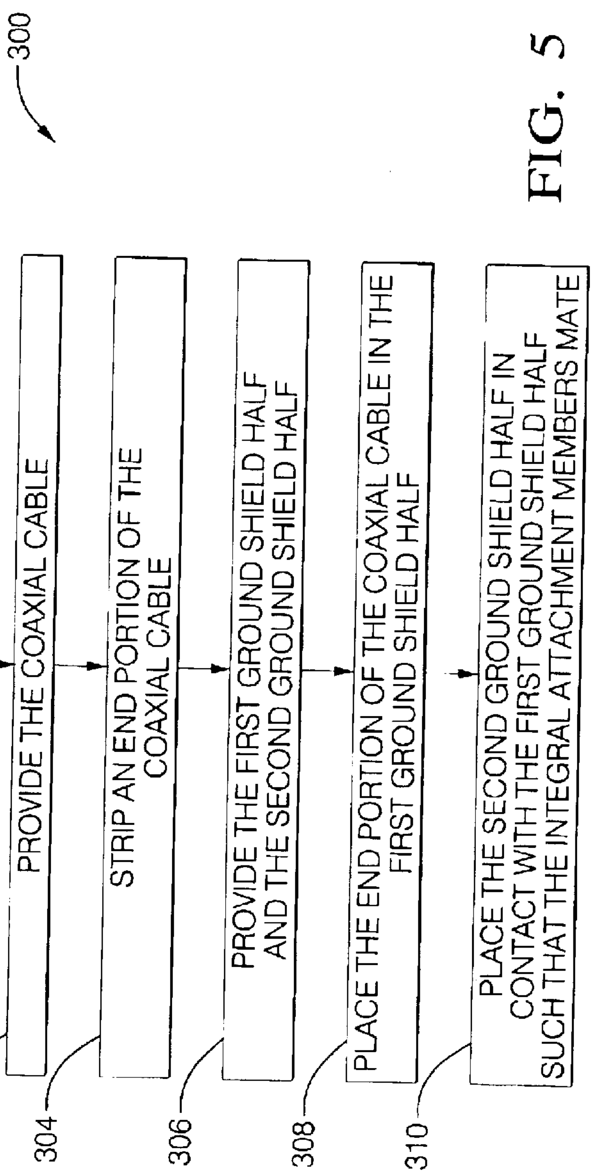
FIG. 5 is a flow diagram of a method of the present invention.

Referring now to FIG. 5, a flowchart 300 illustrates a preferred embodiment of a method for electrically connecting the ground shield 16 to the coaxial cable 200. FIG. 6 illustrates the terminal 10 along with the coaxial cable 200 to depict the elements identified in the flowchart of FIG. 5. Referring back to FIG. 5, in step 302 the coaxial cable 200 is provided including an inner conductor 202, an inner dielectric sheath 204 around said inner conductor 202, an outer conductor layer 206 having a cylindrical outer surface and concentrically surrounding said inner dielectric sheath 204 and inner conductor 202, and an outer dielectric sheath 208 around said outer conductor 206.

In step 304, an end portion 210 of the coaxial cable 200 is stripped leaving an exposed tip of inner conductor 202, an exposed axial length of inner dielectric 204, and an exposed axial length of outer conductor layer 206. Optionally, the end portion 210 of the coaxial cable 200 may be stripped without leaving the exposed axial length of inner dielectric 204. However, it is preferable to have an exposed axial length of inner dielectric 204 to prevent the conductive bonding agent 90 from contacting the exposed inner conductor 202.

In step 306, the conductive ground shield 16 is provided, the ground shield 16 includes the first housing member **20*a* and the second housing member 20*b*, each of the housing members 20*a*, 20*b* includes a channel 104 defined by a substantially half cylindrical surface having a contact portion 78 which intimately matches the shape of the exposed axial length of the outer conductor layer 206, each of the housing members 20*a*, 20*b* also include mating, integral attachment members capable of being joined together to form the channels 104 into a complete cylinder. Preferably, the mating integral attachment member includes the protruding rail 108 and the complementary slot 110 which extend longitudinally along the opposing edges 112, 114 of each ground shield housing member 20*a*, 20*b*. Each rail 108 fits closely within a respective slot 110. The channel 104 of each housing member 20*a*, 20*b* may also include the coating 106 of conductive bonding agent 90 provided in the contact portion 78 of each of the housing members 20*a*, 20*b***.

In step 308, the end portion of the coaxial cable 200 is placed into the channel 104 of the first housing member **20*a*, aligning the exposed axial length of the outer conductor layer 206 with the contact portion 78**.

Then, in step 310, the second housing member **20*b* is placed in contact with the first housing member 20*a* mating the integral attachment members which preferably include the rail 108 and the complementary slot 10. The channels 104 thereby form a cylinder surrounding and electrically contacting the exposed axial length of outer conductor layer 206. The contact portion 78 of the second housing member 20*b* aligns with the exposed axial length of the outer conductor layer 206. In a preferred embodiment of the method, the coating 106 of the conductive bonding agent 90 is provided in the contact portion 78 of each of the housing members 20*a*, 20*b*, and the conductive bonding agent 90 is heated until it flows between the housing members 20*a*, 20*b* forming a both a mechanical bond between the housing members 20*a*, 20*b* and the conductor layer 206 between when the conductive bonding agent 90 cools. Bonding agent 90 can also flow into the seam between the housing members 20*a* and 20*b* and directly mechanically bond them together. Also in the preferred embodiment of the method, the conductive bonding agent 90 is heated in the same heating step until it flows between the housing members 20*a*, 20*b* and the outer conductor layer 206 forming a conductive bond between the housing members 20*a*, 20*b* and the outer conductor layer 206 when the conductive bonding agent cools. In an alternate embodiment, each of the housing members 20*a*, 20*b* are provided with corresponding form fit features, and the two housing members 20*a*, 20*b* are mechanically attached by pressing the two housing members 20*a*, 20*b* together. In another alternate embodiment, the two housing members 20*a*, 20*b* arc attached using a welding process. In yet another alternate embodiment, a bonding agent such as solder is injected into the passageway 74 or otherwise applied to the housing members 20*a*, 20*b*** to bond them together.

This invention has been described with reference to a preferred embodiment and modifications thereto. Further modifications and alterations may occur to others upon reading and understanding the specification. It is intended to include all such modifications and alterations insofar as they come within the scope of the invention.

What is claimed is:

1. A terminal for an end of a coaxial cable, said coaxial cable including an inner conductor, an inner dielectric sheath around said inner conductor, an outer conductor layer having a cylindrical outer surface and concentrically surrounding said inner dielectric sheath and inner conductor, and an outer dielectric sheath around said outer conductor, and in which said coaxial cable end has been stripped back to expose a tip of said inner conductor, an axial length of said inner dielectric sheath, and an axial length of said outer conductor layer outer surface, said terminal comprising:

an electrically conductive core conductor for electrically connecting with said inner conductor of said coaxial cable;

a dielectric member having a body for receipt therein of said core conductor;

a ground shield comprising first and second electrically conductive housing members, each said housing member including a channel comprising a substantially half cylindrical surface intimately matching the shape of the exposed length of outer surface of said cable outer conductor layer, wherein each of said housing members also includes first and second mating, integral attachment members capable of being joined together to thereby form said channels into a complete cylinder, whereby, when said ground shield housing members are joined together, said channel surfaces intimately contact said exposed length of outer conductor layer, creating a conductive connection between said outer conductor layer and said ground shield and structurally maintaining said outer conductor layer concentric to said dielectric sheath and said inner conductor.

2. The terminal of claim 1, further comprising a conductive bonding agent disposed between said ground shield and said exposed length of outer conductor layer.

3. The terminal of claim 2, wherein said conductive bonding agent comprises solder.

4. The terminal of claim 2, wherein said channel has a reduced diameter portion contacting said axial length of said inner dielectric sheath to prevent said conductive bonding agent from contacting said core conductor and said exposed tip of inner conductor.

5. The terminal of claim 1, wherein said ground shield includes at least one raised portion for engaging said outer dielectric sheath for resisting movement of said cable relative to said ground shield.

6. The terminal of claim 5, wherein said ground shield includes at least one raised rib and said body of said dielectric member includes at least one groove, said rib engaging said groove for resisting movement of said dielectric member relative to said ground shield.

7. The terminal of claim 1, wherein said first and said second housing members are joined at a plane extending along an axis of said internal passageway.

8. The terminal of claim 7, wherein said first and said second housing members are identically configured.

9. The terminal of claim 1, wherein each of said housing members being formed by a die cast process.

10. The terminal of claim 1, wherein each of said mating, integral attachment members of said housing members include a protruding rail and a complementary slot which extend along opposing edges of each housing member, said rail of each said housing member being received in said complementary slot of the other of said housing members.

11. The terminal of claim 1, wherein each of said housing members being rigid.

12. A ground shield for an end of a coaxial cable, said coaxial cable including an inner conductor, an inner dielectric sheath around said inner conductor, an outer conductor layer having a cylindrical outer surface and concentrically surrounding said inner dielectric sheath and inner conductor, and an outer dielectric sheath around said outer conductor, and in which said coaxial cable end has been stripped back to expose an axial length of said outer conductor layer outer surface, said ground shield comprising:

first and second electrically conductive, rigid ground shield housing members, each said housing member including a channel comprising a substantially half cylindrical surface intimately matching the shape of the exposed length of outer surface of said cable outer conductor layer, said housing members capable of being joined together to thereby form said channels into a complete cylinder, whereby, when said ground shield housing members are joined together, said channel surfaces intimately contact said exposed length of outer conductor layer, creating a conductive connection between said outer conductor layer and said ground shield and structurally maintaining said outer conductor layer concentric to said dielectric sheath and said inner conductor.

13. The ground shield of claim 12, further comprising a conductive bonding agent disposed between said axial length of said outer conductor layer outer surface and said housing members.

14. The ground shield of claim 13, wherein said housing members each include mating, integral attachment members which are joined together.

15. The ground shield of claim 12, wherein each of said housing members include at least one raised portion for engaging said outer dielectric sheath for resisting movement of said cable relative to said housing members.

16. A ground shield for an end of a coaxial cable, said coaxial cable including an inner conductor, an inner dielectric sheath around said inner conductor, an outer conductor layer having a cylindrical outer surface and concentrically surrounding said inner dielectric sheath and inner conductor, and an outer dielectric sheath around said outer conductor, and in which said coaxial cable end has been stripped back to expose an axial length of said outer conductor layer outer surface, said ground shield comprising:

first and second electrically conductive housing members formed by a die casting process, each said housing member including a channel comprising a portion of a cylinder intimately matching the shape of said exposed length of said outer surface of said outer conductor layer, said housing members capable of being joined together to form said channels into a complete cylinder, whereby when said ground shield housing member are joined together, said channel surfaces electrically contact said exposed length of outer conductor layer, creating a conductive connection between said outer conductor layer and said ground shield and structurally maintaining said outer conductor layer concentric to said dielectric sheath and said inner conductor.

17. The ground shield of claim 16, further comprising a conductive bonding agent disposed on said portion of a substantially cylinder surface.

18. The ground shield of claim 16, wherein said housing members each include mating, integral attachment members which are capable of being joined together.

19. The ground shield of claim 16, wherein said ground shield includes at least one raised portion for engaging said outer dielectric sheath for resisting movement of said cable relative to said ground shield.

* * * * *